US012741291B2

(12) United States Patent
Wong et al.

(10) Patent No.: US 12,741,291 B2
(45) Date of Patent: Sep. 22, 2026

(54) FASTENERS FOR COUPLING COMPONENTS OF SHOWERHEAD ASSEMBLIES

(71) Applicant: APPLIED MATERIALS, INC., Santa Clara, CA (US)

(72) Inventors: Carlaton Wong, Sunnyvale, CA (US); Reyn Tetsuro Wakabayashi, San Jose, CA (US)

(73) Assignee: Applied Materials Inc., Santa Clara, CA (US)

( * ) Notice: Subject to any disclaimer, the term of this patent is extended or adjusted under 35 U.S.C. 154(b) by 589 days.

(21) Appl. No.: 17/240,462

(22) Filed: Apr. 26, 2021

(65) Prior Publication Data

US 2021/0331183 A1 Oct. 28, 2021

Related U.S. Application Data

(60) Provisional application No. 63/015,188, filed on Apr. 24, 2020.

(51) Int. Cl.

| | |
|---|---|
| ***B05B 1/18*** | (2006.01) |
| ***F16B 29/00*** | (2006.01) |
| ***F16B 37/04*** | (2006.01) |
| ***F16B 37/12*** | (2006.01) |

(52) U.S. Cl.

CPC ................ *B05B 1/18* (2013.01); *F16B 29/00* (2013.01); *F16B 37/041* (2013.01); *F16B 37/122* (2013.01)

(58) Field of Classification Search

CPC ... B05B 1/18; B05B 1/14; B05B 1/185; F16B 29/00; F16B 37/041; F16B 37/122; F16B 37/044; F16B 37/125; F16B 37/127

USPC ............... 411/242, 166, 177, 178, 182, 183; 239/548; 427/570

See application file for complete search history.

(56) References Cited

U.S. PATENT DOCUMENTS

| | | | | | |
|---|---|---|---|---|---|
| 502,477 | A * | 8/1893 | Tolan, Jr. | F16B 39/025 | 411/242 |
| 1,183,555 | A * | 5/1916 | Green | F16B 39/025 | 411/242 |
| 1,978,935 | A * | 10/1934 | Douglas | F16B 29/00 | 411/80.2 |
| 2,296,470 | A * | 9/1942 | Keehn | F16B 29/00 | 411/53 |

(Continued)

FOREIGN PATENT DOCUMENTS

| | | | |
|---|---|---|---|
| JP | 2003059625 A | 2/2003 | |
| KR | 101514397 B1 * | 7/2015 | F16B 37/04 |

(Continued)

OTHER PUBLICATIONS

U.S. Appl. No. 17/240,462, filed Apr. 26, 2021.

*Primary Examiner* — Christine M Mills
*Assistant Examiner* — Dil K. Magar
(74) *Attorney, Agent, or Firm* — Moser Taboada

(57) ABSTRACT

Embodiments of showerhead assemblies and fasteners for use in coupling components of showerhead assemblies are provided herein. More particularly, the fasteners described herein can advantageously be used to connect a gas distribution plate to a backing plate of the showerhead assembly. The fasteners described herein can further advantageously be used to robustly connect components together where the components have different coefficients of thermal expansion.

8 Claims, 8 Drawing Sheets

(56) References Cited

U.S. PATENT DOCUMENTS 2,400,318 A * 5/1946 Rosan .................... F16B 39/10 285/91
2,455,885 A * 12/1948 Theurer ................ F16B 37/122 411/937.2
2,469,349 A * 5/1949 Zeidler ................... F16B 29/00 411/80.2
2,561,433 A * 7/1951 Uhle ..................... F16B 37/122 411/80.6
2,616,328 A * 11/1952 Kingsmore ............ F16B 29/00 411/80.2
2,649,884 A * 8/1953 Westover ............. F16B 37/043 411/173
2,783,811 A * 3/1957 Cummaro .............. F16B 39/06 411/968
2,785,726 A * 3/1957 Brush .................. F16B 37/122 411/16
2,822,014 A * 2/1958 Cummaro .............. B29C 70/58 411/968
2,877,817 A * 3/1959 Rockwell ............. F16B 37/122 411/965
3,110,212 A * 11/1963 Wing .................... F16B 37/122 411/80.6
3,373,648 A * 3/1968 Pitzer ..................... F16B 29/00 411/24
3,413,886 A * 12/1968 Proctor ................. F16B 37/044 411/969
4,084,750 A * 4/1978 Fett ..................... B01D 24/4636 210/293
4,218,954 A * 8/1980 Morel .................. F16B 13/124 411/39
4,503,486 A * 3/1985 Makita ................ B60Q 1/0683 362/419
4,657,458 A * 4/1987 Wollar ................. F16B 37/043 411/64
4,890,966 A * 1/1990 Umezawa ........... F16B 19/1081 411/908
5,106,225 A * 4/1992 Andre .................. F16B 5/0233 411/182
5,547,323 A * 8/1996 Fang .................... F16B 37/122 411/386
5,632,582 A * 5/1997 Gauron ..................... F16B 5/01 411/258
5,692,865 A * 12/1997 Pratt ...................... A43C 15/02 411/517
5,707,097 A * 1/1998 Horwill ................. F16B 5/0258 411/182
5,746,559 A * 5/1998 Shirai ................. B60Q 1/0683 411/437
6,005,018 A * 12/1999 Cicierega ............ A61F 2/30734 623/20.16
6,045,291 A * 4/2000 Ruehle ................ F16B 19/1081 411/57.1
6,238,127 B1 * 5/2001 Jhumra ................... F16C 17/10 384/295
6,360,965 B1 * 3/2002 Clearman ............ B05B 3/0486 239/443
8,187,413 B2 5/2012 Patrick et al.
8,343,191 B2 * 1/2013 Matthis .............. A61B 17/7032 606/301
8,628,268 B2 1/2014 Kellogg et al.
8,673,080 B2 3/2014 Meinhold et al.
9,476,444 B2 * 10/2016 Droste .................. F16B 37/122
10,006,404 B2 6/2018 Parkhe
2001/0014263 A1 * 8/2001 Giannakakos .......... F16B 37/12 411/432
2001/0022924 A1 * 9/2001 Wieser .................. F16B 37/122 411/60.1
2003/0190213 A1 * 10/2003 Lutkus .................... F16B 37/12 411/178
2006/0147292 A1 * 7/2006 Lebot .................... E06B 3/5436 411/182
2006/0266852 A1 * 11/2006 Choi ................ C23C 16/45565 239/548
2008/0031702 A1 * 2/2008 Chen ..................... F16B 37/122 411/182
2008/0268173 A1 * 10/2008 White .............. H01J 37/32495 118/728
2008/0310933 A1 * 12/2008 Ricciardo .............. F16B 39/10 411/389
2009/0214798 A1 * 8/2009 Yousif ................ H01L 21/6708 156/345.34
2011/0008125 A1 * 1/2011 Moon ....................... F16B 5/02 411/108
2011/0253044 A1 * 10/2011 Tam ................. H01L 21/67115 118/712
2011/0284100 A1 * 11/2011 Kudela ............ H01J 37/32651 137/343
2012/0055632 A1 * 3/2012 de la Llera ............ H01R 13/20 156/345.34
2012/0151733 A1 * 6/2012 Fabre .................... F16B 13/063 403/374.1
2013/0052804 A1 * 2/2013 Song .................. C23C 16/4411 118/724
2013/0306758 A1 * 11/2013 Park ...................... C23C 16/509 239/418
2014/0023453 A1 * 1/2014 Hollensen .............. F16B 37/12 411/178
2014/0097270 A1 * 4/2014 Liang .................... C23C 16/452 239/548
2014/0209027 A1 * 7/2014 Lubomirsky ....... H01J 37/3244 118/724
2014/0217193 A1 * 8/2014 Breiling .................... B05B 7/22 239/553
2015/0034481 A1 2/2015 Ishihara
2016/0325293 A1 * 11/2016 Irwin ........................ B05B 3/06
2017/0152968 A1 * 6/2017 Raj .................. H01J 37/32477
2017/0243724 A1 * 8/2017 Noorbakhsh ..... H01J 37/32449
2018/0144907 A1 * 5/2018 Franklin ........... H01L 21/67248
2018/0318855 A1 * 11/2018 Russell ..................... B05B 1/18
2019/0093337 A1 * 3/2019 Cabaj .................. F16B 13/0858
2019/0189491 A1 6/2019 Akatsuka
2020/0040587 A1 * 2/2020 Yu ....................... E04F 11/1812
2021/0062849 A1 * 3/2021 Heinrichs ............... F16B 29/00
2021/0146394 A1 * 5/2021 Doering .............. C23C 16/4401
2024/0322312 A1 * 9/2024 Schurz ................ H01M 50/159

FOREIGN PATENT DOCUMENTS

KR 1015143970000 7/2015
WO WO-2016179316 A1 * 11/2016 ............... B05B 1/14

* cited by examiner

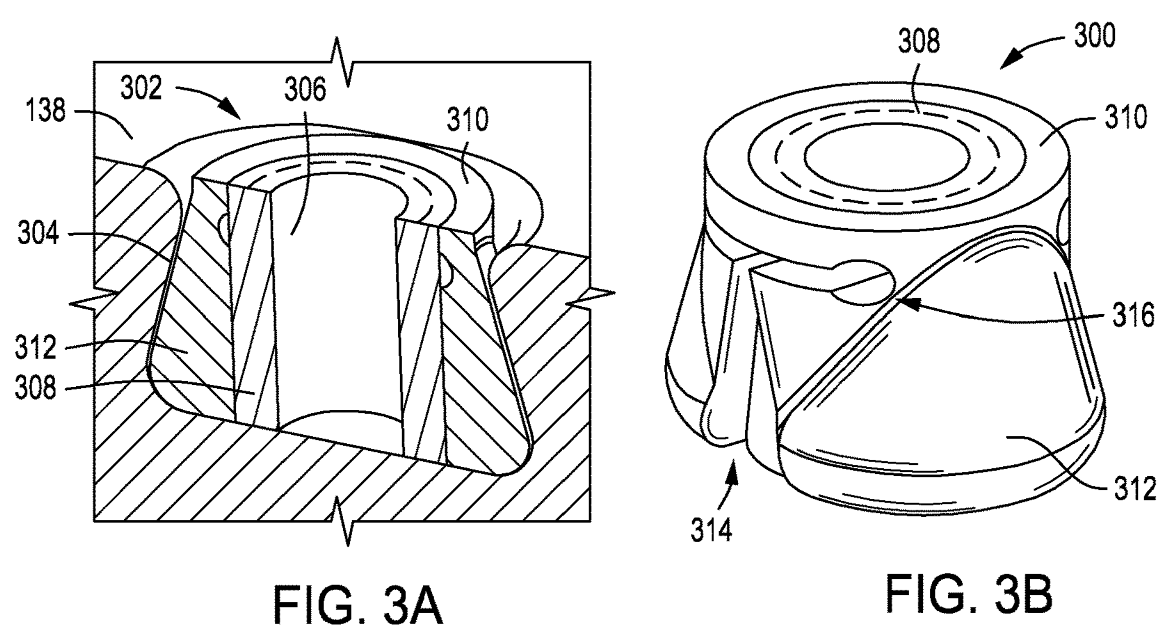
FIG. 3A
FIG. 3B
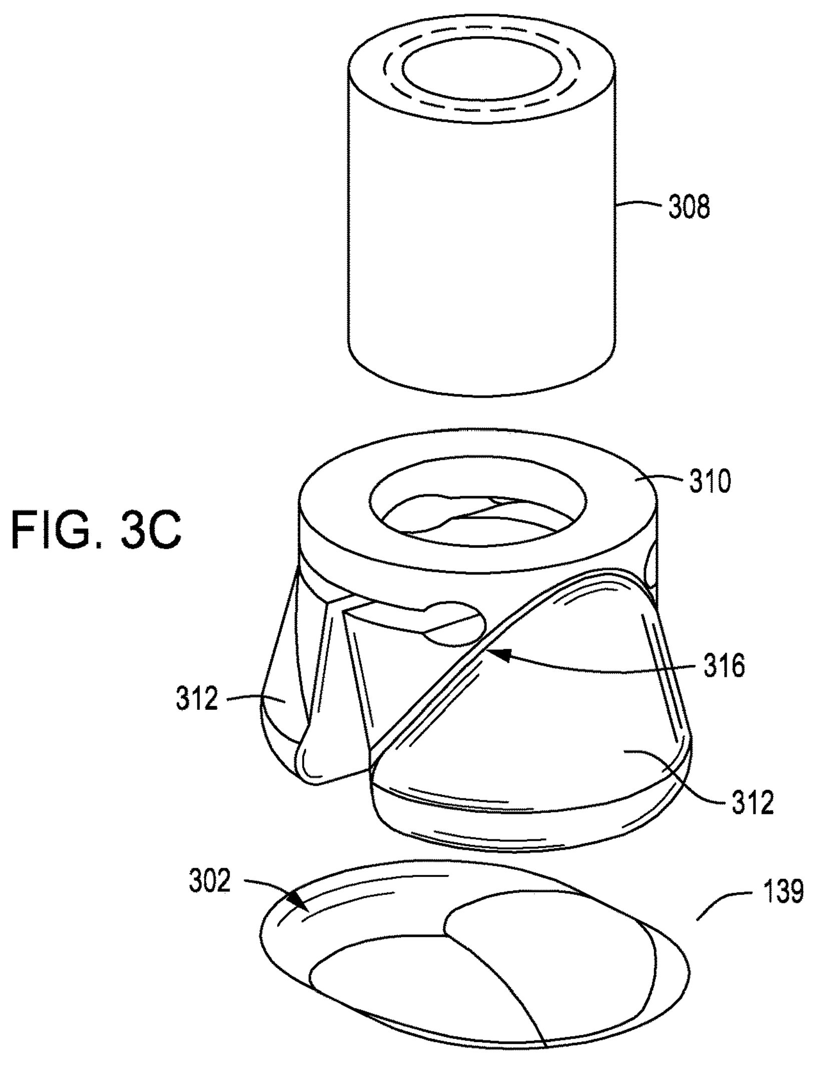
FIG. 3C

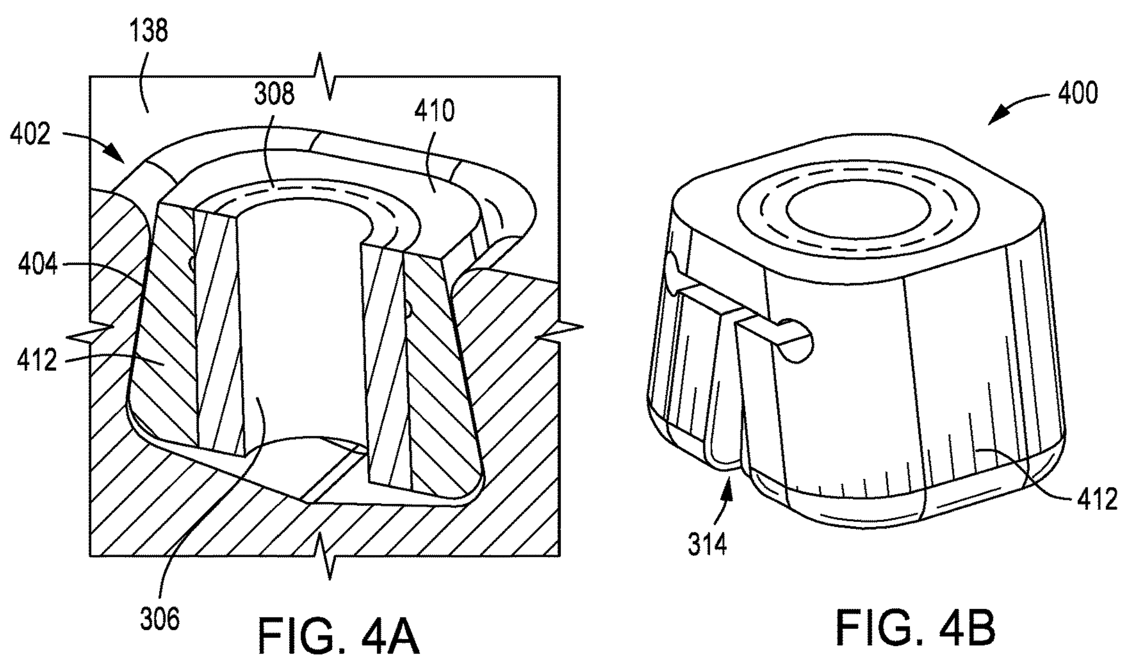
FIG. 4A
FIG. 4B
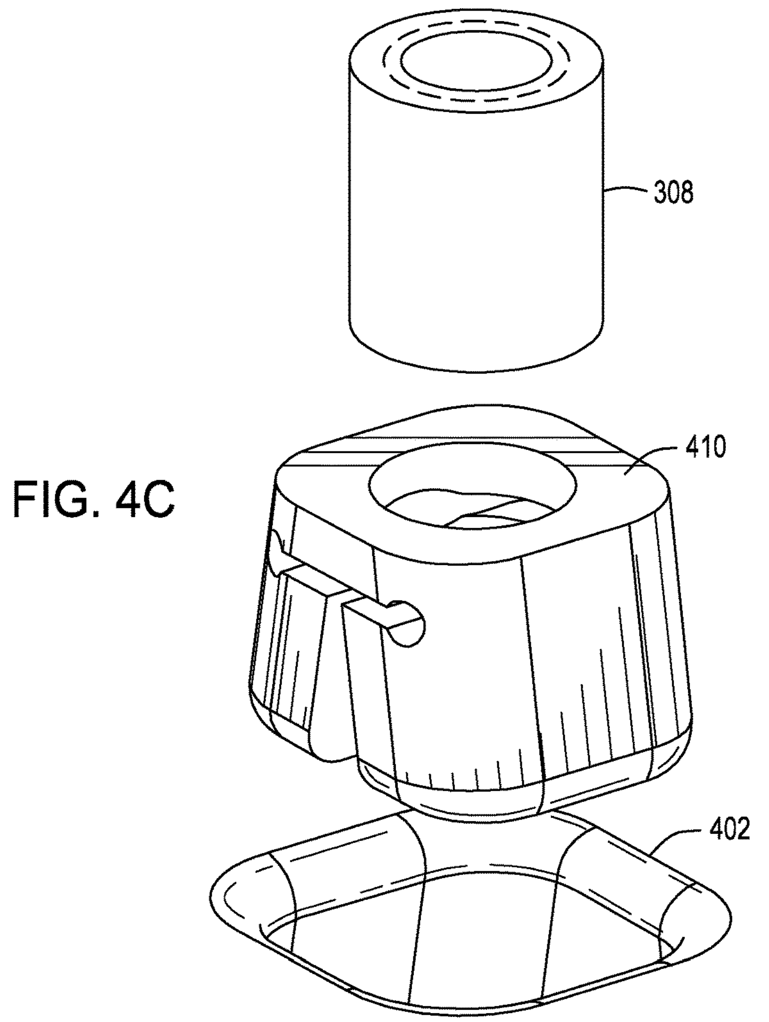
FIG. 4C

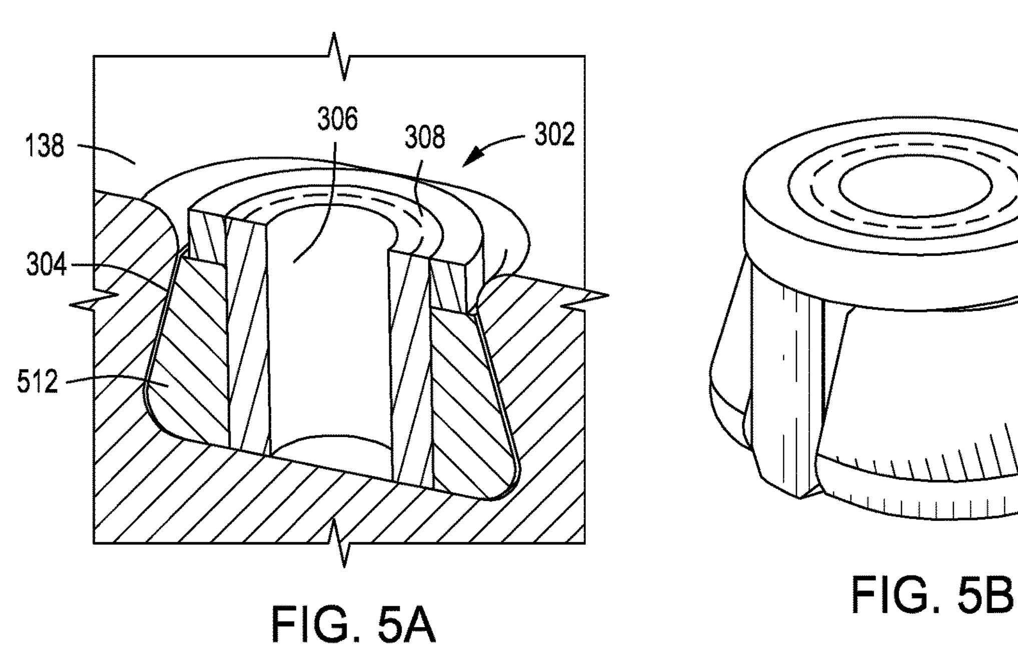
FIG. 5A
FIG. 5B
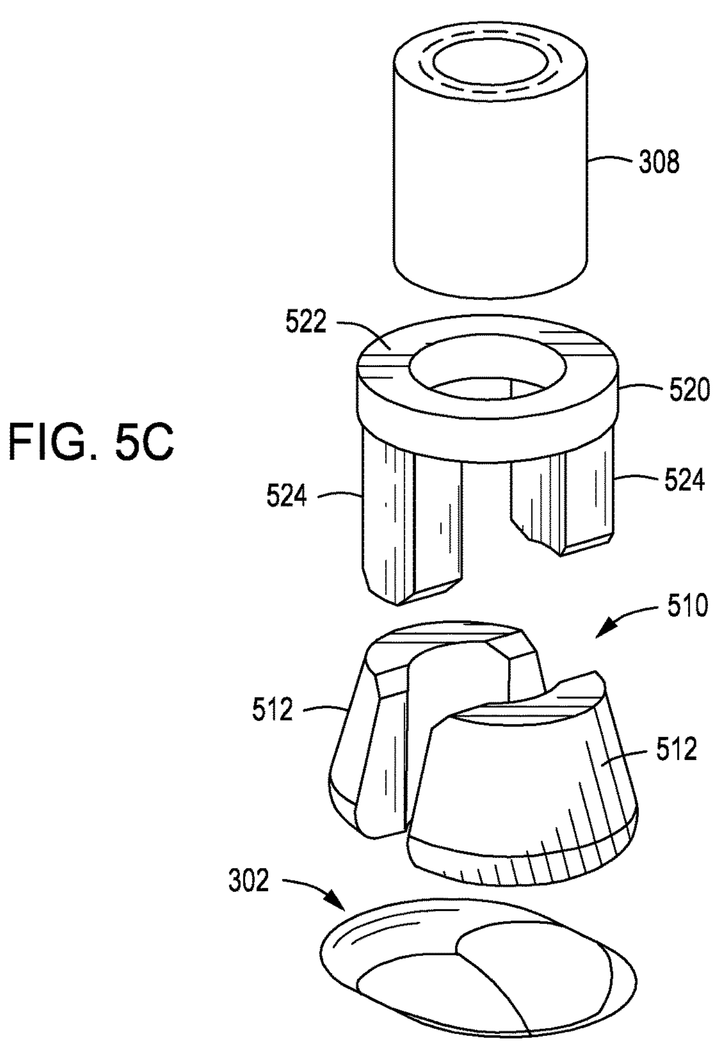
FIG. 5C

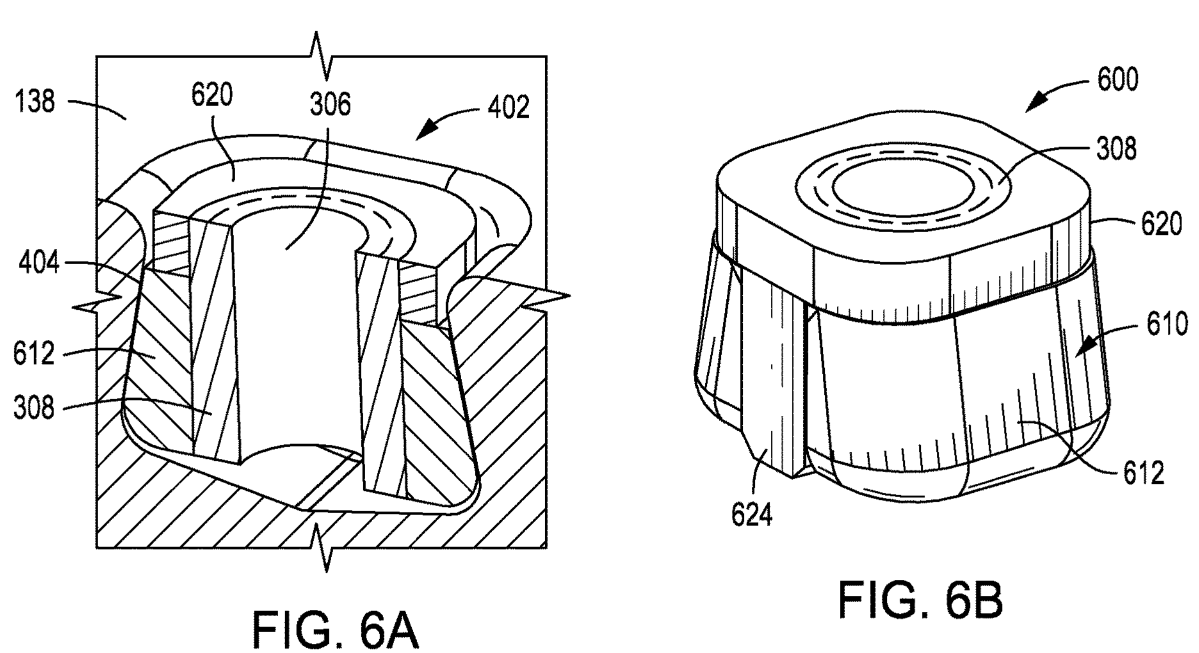
FIG. 6A
FIG. 6B
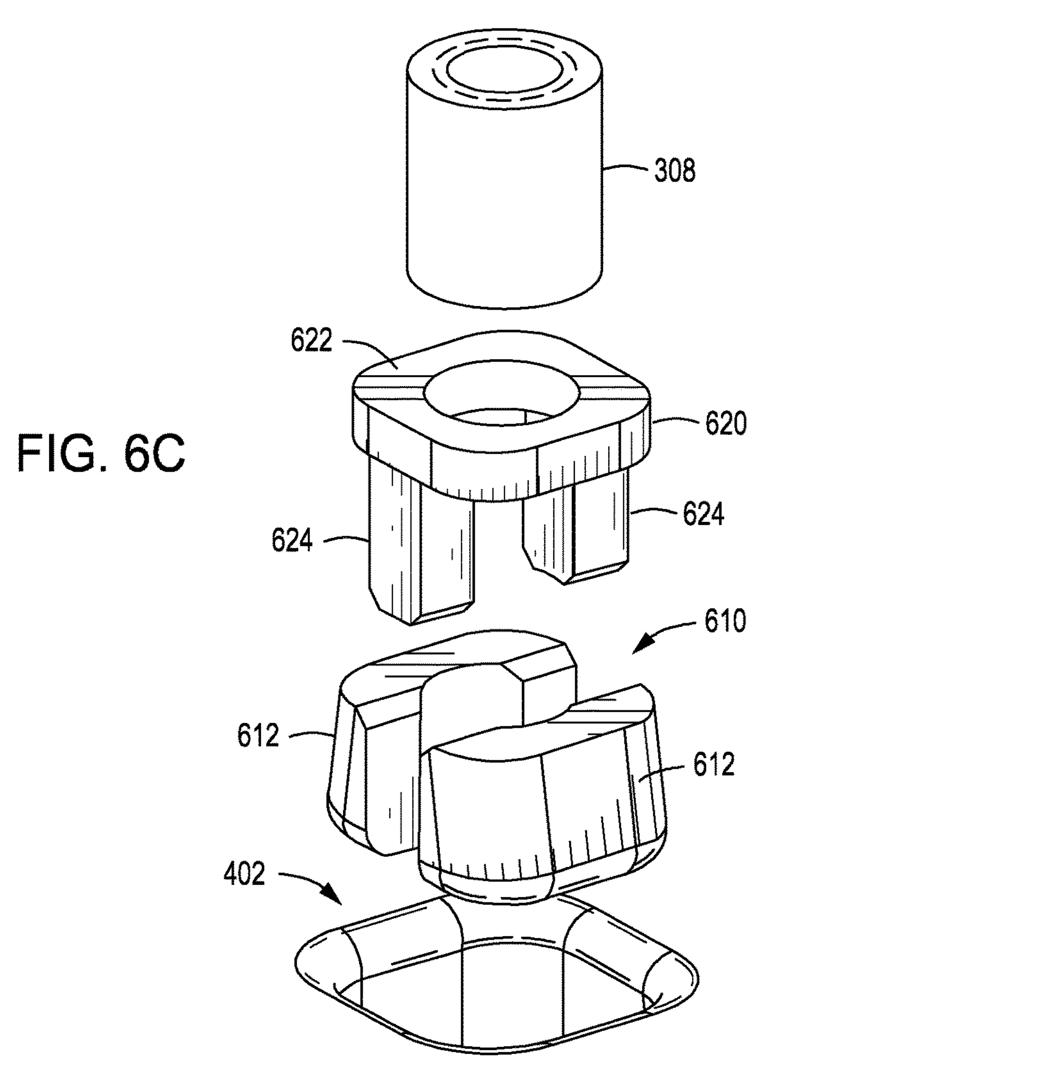
FIG. 6C

FASTENERS FOR COUPLING COMPONENTS OF SHOWERHEAD ASSEMBLIES

CROSS-REFERENCE TO RELATED APPLICATIONS

This application claims benefit of U.S. provisional patent application Ser. No. 63/015,188 filed Apr. 24, 2020, which is herein incorporated by reference in its entirety.

FIELD

Embodiments of the present disclosure generally relate to semiconductor substrate processing, and more particularly, to showerhead assemblies for use in substrate processing systems.

BACKGROUND

Conventional showerhead assemblies configured for use with process chambers, such as those used in microelectronic device fabrication, for example, typically include a gas distribution plate that has a backing plate coupled thereto. For example, the backing plate can be coupled to the gas distribution plate using one or more connecting devices, e.g., bolts, screws, clamps, etc. While such connecting devices are suitable for connecting the backing plate to the gas distribution plate in some applications, the inventors have observed that stresses arising from differences in expansion and contraction of components can sometimes undesirably compromise the gas distribution plate, for example leading to breakage or particle generation.

Accordingly, the inventors have provided embodiments of improved showerhead assemblies and methods of manufacturing the same.

SUMMARY

Embodiments of showerhead assemblies and fasteners for use in coupling components of showerhead assemblies are provided herein. More particularly, the fasteners described herein can advantageously be used to connect a gas distribution plate to a backing plate of the showerhead assembly. The fasteners described herein can further advantageously be used to robustly connect components together where the components have different coefficients of thermal expansion. Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

FIGS. 3A, 3B, and 3C respectively schematically depict a top isometric view in cross-section, a top isometric view, and an exploded top isometric view of a fastener according to at least some embodiments of the present disclosure.

FIGS. 4A, 4B, and 4C respectively schematically depict a top isometric view in cross-section, a top isometric view, and an exploded top isometric view of a fastener according to at least some embodiments of the present disclosure.

FIGS. 5A, 5B, and 5C respectively schematically depict a top isometric view in cross-section, a top isometric view, and an exploded top isometric view of a fastener according to at least some embodiments of the present disclosure.

FIGS. 6A, 6B, and 6C respectively schematically depict a top isometric view in cross-section, a top isometric view, and an exploded top isometric view of a fastener according to at least some embodiments of the present disclosure.

Figure 1:
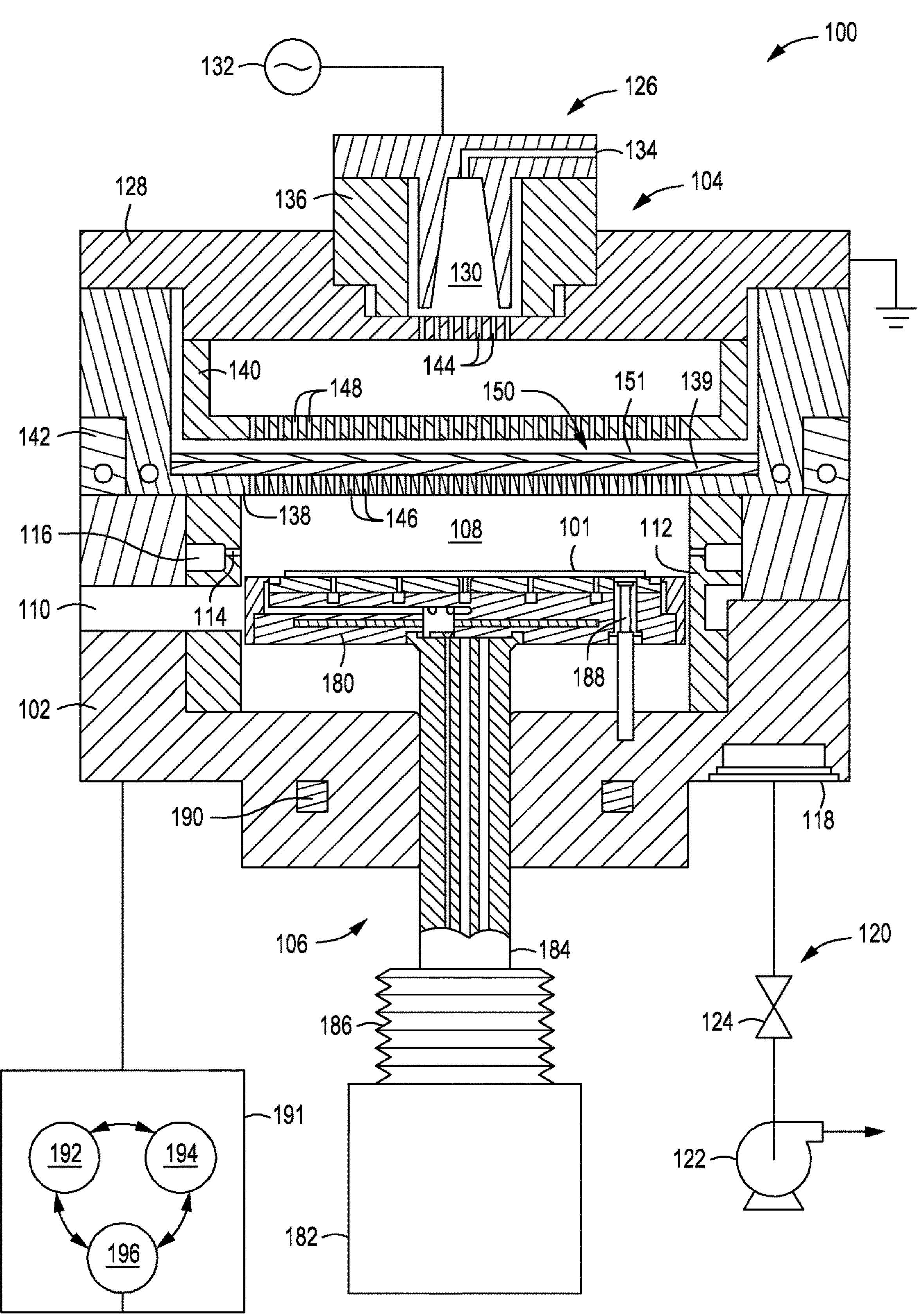
FIG. 1 is a schematic cross sectional view of a processing chamber, according to at least some embodiments of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of showerhead assemblies and fasteners for use in coupling components of showerhead assemblies are provided herein. More particularly, the fasteners described herein can advantageously be used to connect a gas distribution plate to a backing plate of the showerhead assembly. Unlike conventional gas distribution plate assemblies, the fasteners of the present disclosure compensate for and/or absorb forces that may arise due to thermal expansion mismatch between the gas distribution plate, the backing plate, and/or the fasteners present from operation of the showerhead assembly (e.g., when processing substrates in a substrate processing chamber including the showerhead assembly). Although described in connection with coupling components of a showerhead, and showing particular benefit for such applications, the fasteners of the present disclosure may also be generally used to couple varying components together, including those used in other applications, in accordance with the embodiments described below.

FIG. 1 is a cross sectional view of a processing chamber 100 having a showerhead assembly 150 according to at least some embodiments of the present disclosure. As shown, the processing chamber 100 is an etch chamber suitable for etching a substrate, such as substrate 101. Examples of processing chambers that may be adapted to benefit from the embodiments of the disclosure are SYM3® and MESA™ processing chambers, commercially available from Applied Materials, Inc., located in Santa Clara, California Other processing chambers, including those configured for applications other than etching and/or those from other manufacturers, may be adapted to benefit from the embodiments of the disclosure.

The processing chamber 100 may be used for various plasma processes. In one embodiment, the processing chamber 100 may be used to perform dry etching with one or more etching agents. For example, the processing chamber may be used for ignition of plasma from a precursor such as a fluorocarbon, e.g., CxFy (where x and y can be different allowed combinations), oxygen ($O_2$), nitrogen trifluoride ($NF_3$), or combinations thereof.

The processing chamber 100 includes a chamber body 102, a lid assembly 104, and a support assembly 106. The lid assembly 104 is positioned at an upper end of the chamber body 102. The support assembly 106 is disclosed in an interior volume 108, defined by the chamber body 102. The chamber body 102 includes a slit valve opening 110 formed in a sidewall thereof. The slit valve opening 110 is selectively opened and closed to allow access to the interior volume 108 by a substrate handling robot (not shown) for substrate transfer.

The chamber body 102 may further include a liner 112 that surrounds the support assembly 106. The liner 112 may be made of a metal such as (Al), a ceramic material, or any other process compatible material. In one or more embodiments, the liner 112 includes one or more apertures 114 and a pumping channel 116 formed therein that is in fluid communication with a vacuum port 118. The apertures 114 provide a flow path for gases into the pumping channel 116. The pumping channel 116 provides an egress for the gases within the processing chamber 100 to vacuum port 118. The liner 112 further includes an opening corresponding to the slit valve opening 110 to facilitate substrate transfer into and out of the processing chamber 100.

A vacuum system 120 is coupled to the vacuum port 118. The vacuum system 120 may include a vacuum pump 122 and a throttle valve 124. The throttle valve 124 regulates the flow of gases through the processing chamber 100. The vacuum pump 122 is coupled to the vacuum port 118 disposed in the interior volume 108.

The lid assembly 104 includes at least two stacked components configured to form a plasma volume or cavity therebetween. In some embodiments, the lid assembly 104 includes a first electrode 126 ("upper electrode") disposed vertically above a second electrode 128 ("lower electrode"). The first electrode 126 and the second electrode 128 confine a plasma cavity 130, therebetween. The first electrode 126 is coupled to a power source 132, such as an RF power supply. The second electrode 128 is connected to ground, forming a capacitor between the first electrode 126 and second electrode 128. The first electrode 126 is in fluid communication with a gas inlet 134 that is connected to a gas supply (not shown), which provides gas to the process chamber 100 via the gas inlet 134. The first end of the one or more gas inlets 134 opens into the plasma cavity 130.

The lid assembly 104 may also include an isolator ring 136 that electrically isolates the first electrode 126 from the second electrode 128. The isolator ring 136 may be made from aluminum oxide (AlO) or any other process-compatible insulative material.

The lid assembly 104 may also include showerhead assembly 150 and, optionally, a blocker plate 140. In some embodiments, the showerhead assembly 150 includes a gas distribution plate 138, a backing (gas) plate 139, and a chill plate 151. In some embodiments, the second electrode 128, the gas distribution plate 138, the chill plate 151, and the blocker plate 140 are stacked and disposed on a lid rim 142, which is coupled to the chamber body 102.

The chill plate 151 is configured to regulate a temperature of the gas distribution plate 138 during processing. For example, the chill plate 151 may include one or more temperature control channels (not shown) formed therethrough such that a temperature control fluid may be provided therein to regulate the temperature of the gas distribution plate 138.

In one or more embodiments, the second electrode 128 may include a plurality of gas passages 144 formed beneath the plasma cavity 130 to allow gas from the plasma cavity 130 to flow therethrough. The backing plate 139 includes one of more gas passages 217 and one or more gas delivery channels 219 (see FIG. 2, for example), thus allowing gas to flow from the one or more gas passages 217 and into the processing region. Similarly, the gas distribution plate 138 includes a plurality of apertures 146 configured to distribute the flow of gases therethrough. The blocker plate 140 may optionally be disposed between the second electrode 128 and the gas distribution plate 138. The blocker plate 140 includes a plurality of apertures 148 to provide a plurality of gas passages from the second electrode 128 to the gas distribution plate 138.

The support assembly 106 may include a support member 180. The support member 180 is configured to support the substrate 101 for processing. The support member 180 may be coupled to a lift mechanism 182 through a shaft 184, which extends through a bottom surface of the chamber body 102. The lift mechanism 182 may be flexibly sealed to the chamber body 102 by a bellows 186 that prevents vacuum leakage from around the shaft 184. The lift mechanism 182 allows the support member 180 to be moved vertically within the chamber body 102 between a lower transfer portion and a number of raised process positions. Additionally, one or more lift pins 188 may be disposed through the support member 180. The one or more lift pins 188 are configured to extend through the support member 180 such that the substrate 101 may be raised off the surface of the support member 180. The one or more lift pins 188 may be active by a lift ring 190.

The processing chamber may also include a controller 191. The controller 191 includes programmable central processing unit (CPU) 192 that is operable with a memory 194 and a mass storage device, an input control unit, and a display unit (not shown), such as power supplies, clocks, cache, input/output (I/O) circuits, and the liner, coupled to the various components of the processing system to facilitate control of the substrate processing.

To facilitate control of the processing chamber 100 described above, the CPU 192 may be one of any form of general-purpose computer processor that can be used in an industrial setting, such as a programmable logic controller (PLC), for controlling various chambers and sub-processors. The memory 194 is coupled to the CPU 192 and the memory 194 is non-transitory and may be one or more of readily available memory such as random access memory (RAM), read only memory (ROM), floppy disk drive, hard disk, or any other form of digital storage, local or remote. Support circuits 196 are coupled to the CPU 192 for supporting the processor in a conventional manner. Charged species generation, heating, and other processes are generally stored in the memory 194, typically as software routine. The software routine may also be stored and/or executed by a second CPU (not shown) that is remotely located from the processing chamber 100 being controlled by the CPU 192. The memory 194 is in the form of computer-readable storage media that contains instructions, that when executed by the CPU 192, facilitates the operation of the processing chamber 100.

Figure 2:
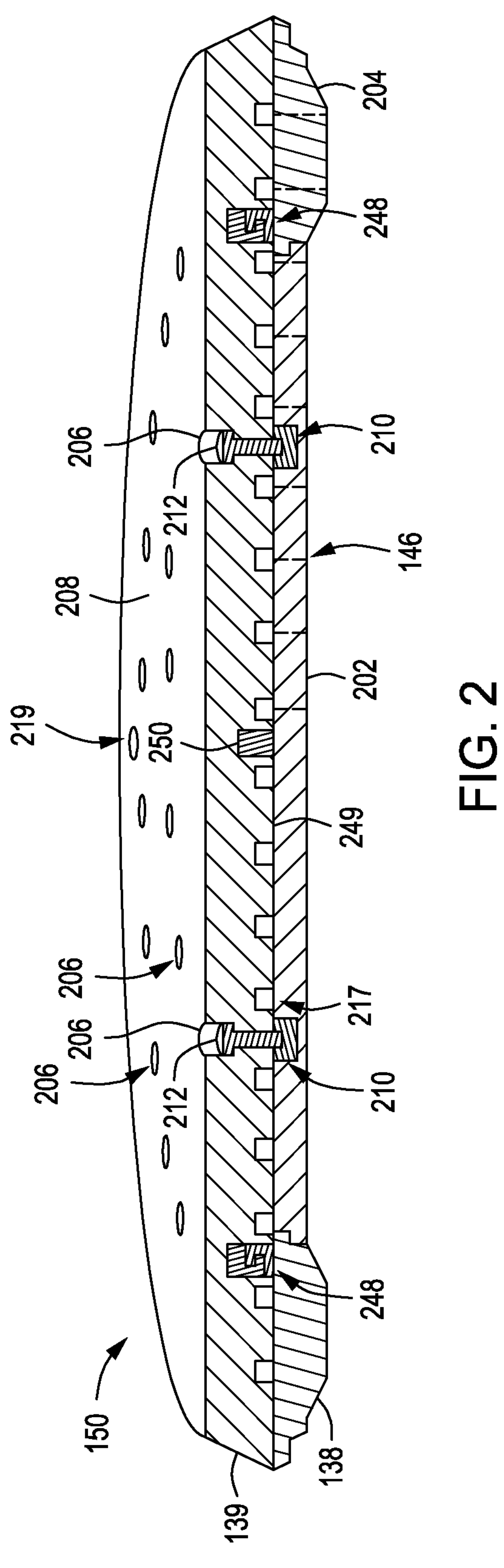
FIG. 2 is a schematic side cutaway view of a gas distribution plate and backing plate of a showerhead assembly, according to at least some embodiments of the present disclosure.

FIG. 2 is a cross-sectional side view of a gas distribution plate 138 and backing plate 139 of the showerhead assembly 150. As noted above, the showerhead assembly 150 includes the gas distribution plate 138, the backing plate 139 positioned on a top surface of the gas distribution plate 138, and the chill plate 151 (shown in FIG. 1) positioned on a top surface of the backing plate 139. In some embodiments, the gas distribution plate 138 includes an inner portion 202 and an outer portion 204. The inner portion includes a top surface, which faces the backing plate 139, and a bottom surface, which faces the processing region of the processing chamber 100. Similarly, an outer portion 204 of the gas distribution plate 138 includes a top surface, which faces the backing plate 139, and a bottom surface, which faces the processing region of the processing chamber 100.

In at least some embodiments, the inner portion 202 and outer portion 204, when made from the same material (e.g., single crystal Si), can be monolithically formed (e.g., formed as a homogeneous unitary body). Alternatively, the inner portion 202 and outer portion 204 can be connected to each other via one or more suitable connection devices or methods. For example, in the illustrated embodiment, the inner portion 202 and outer portion 204 are connected to each other via a mechanical interface (e.g., corresponding indent/detent) that uses a press fit, so that the inner portion 202 and outer portion 204 can be interlocked to each other. One or more thermal gaskets, O-rings, or other suitable device(s) can be provided at the mechanical interface to ensure a seal is provided between the inner portion 202 and outer portion 204.

The inner portion 202 and the outer portion 204 can be made from one or more materials suitable for use in the process chamber 100. For example, the inner portion 202 and the outer portion 204 can be made from single crystal silicon (Si) and/or polysilicon (poly-Si). In at least some embodiments, the inner portion 202 can be made from single crystal silicon (Si) and the outer portion 204 made from single crystal Si or poly-Si.

A plurality of fasteners 210 (or fastener assemblies) are provided to couple the gas distribution plate 138 to the backing plate 139, as will be described in greater detail below. The fasteners 210 may be distributed about the inner portion 202, the outer portion 204 or both. The number and arrangement of the fasteners 210 can be provided as desired to provide a suitable clamping force and suitable uniformity of the clamping force coupling the gas distribution plate 138 to the backing plate 139. The fasteners 210 advantageously can support higher torque than current state-of-art techniques for coupling showerhead components. Moreover, the fasteners 210 of the present disclosure advantageously have a simple design with few parts that facilitate lower cost of fabrication. In addition, the fasteners 210 also advantageously can be used to couple other components that have different coefficients of thermal expansion.

Exemplary, but non-limiting, examples of embodiments of fastener assemblies suitable for use as the fasteners 210 are depicted in FIGS. 3A through 8B. FIGS. 3A, 3B, and 3C respectively depict a top isometric view in cross-section, a top isometric view, and an exploded top isometric view of a fastener assembly 300, suitable for use as fastener 210, according to at least some embodiments of the present disclosure.

For example, FIG. 3A depicts the gas distribution plate 138 having a hole 302 formed therein for receiving the fastener assembly 300. The hole 302 includes a sidewall having a recess 304 disposed in a lower portion of the hole 302. The recess 304 can be formed in one or more regions of the hole 302, but is generally not formed completely around the hole, such that the fastener assembly 300 cannot rotate within the hole 302. The fastener assembly 300 can be inserted into the hole 302 and includes a threaded inner bore 306 to receive a bolt or screw (e.g., bolt or screw 212 depicted in FIG. 2) when coupling the gas distribution plate 138 to the backing plate 139, such as a stainless steel bolt or screw.

In some embodiments, the fastener assembly 300 includes a threaded insert 308 and a compliant jacket 310. The threaded insert 308 includes the threaded inner bore 306 and may be, for example, a helical coiled wire, such as a HELI-COIL® wire threaded insert, available from STANLEY® Engineered Fastening. The threaded insert 308 (or at least the threaded inner bore 306) can be made from any process-compatible material suitable for receiving the bolt (e.g., 212) for coupling the gas distribution plate 138 to the backing plate 139, such as stainless steel, nitrogen-strengthened stainless steel alloys (such as NITRONIC®), or other materials.

In some embodiments the compliant jacket 310 surrounds the threaded insert 308 and is coupled thereto. For example, the threaded insert 308 may have a threaded outer wall that mates with an inner wall of the compliant jacket 310. For example, where the threaded insert 308 is a helical coiled wire, the threaded insert 308 may be twisted into a central opening of the compliant jacket 310 during installation.

In some embodiments, the compliant jacket 310 (and in each of the embodiments disclosed herein) may have a non-circular geometry in a plane normal to an elongate axis (e.g., a vertical axis in the orientation of the drawings) of the compliant jacket that prevents rotation of the compliant jacket (and the fastener assembly) when installing or removing the threaded insert or when installing or removing the bolt or screw (e.g., 212) that couples the gas distribution plate 138 to the backing plate 139. For example, in some embodiments, the compliant jacket 310 includes protruding features 312 that interface with the recess 304 of the hole 302 in the gas distribution plate 138 to prevent rotation of the compliant jacket 310 when installing or removing the threaded insert 308, or when installing or removing the bolt or screw (e.g., 212) that couples the gas distribution plate 138 to the backing plate 139.

In some embodiments, the compliant jacket 310 further includes a cutout 314 to facilitate compressing the compliant jacket 310 when installing or removing the compliant jacket 310 from the hole 302 (e.g., to facilitate passing the protruding features 312 of the compliant jacket 310 into the smaller opening of the hole 302. In some embodiments, the cutout 314 includes a cutout from the bottom of the compliant jacket 310 toward, but not reaching, the top of the compliant jacket 310. In some embodiments, the cutout 314 may be triangular with the base of the triangle along the bottom of the compliant jacket 310 to provide greater range of compression corresponding to the greater size of the protruding features 312. In some embodiments, the cutout 314 may also include a horizontal slot disposed proximate the top of the compliant jacket 310 to facilitate compression of the compliant jacket 310 without bending or deforming the top portion of the compliant jacket 310. In some embodiments, stress relief holes 316 may also be provided at extreme or terminal portions of the cutout 314 to minimize damage to the compliant jacket 310 when compressing the compliant jacket 310 during installation or removal.

The compliant jacket 310 can be fabricated from process-compatible materials that can elastically deform to compensate for differences in thermal expansion of the gas distribution plate 138, the backing plate 139, and/or the screws or bolts coupling the gas distribution plate 138 to the backing plate 139 (e.g., bolts or screws 212). For example, the compliant jacket 310 can be fabricated from materials that can withstand the temperatures of processes being performed in the processing chamber 100. The compliant jacket 310 can also be fabricated from materials that do not cause hot or cold spots in the gas distribution plate 138 during processing. The compliant jacket 310 can also be fabricated from materials that have a coefficient of thermal expansion (CTE) in a suitable range to compensate for the differences in the CTE of the gas distribution plate 138, the backing plate 139, and/or the screws or bolts coupling the gas distribution plate 138 to the backing plate 139, such as in a range of about 2 to about 11, or in a range of about 2 to about 9. In some embodiments, the compliant jacket 310 can be made from high-temperature thermosetting plastics, such as polyether ether ketone (PEEK), polybenzimidazole (PBI), for example CELAZOLE®, or the like.

FIGS. 4A, 4B, and 4C respectively depict a top isometric view in cross-section, a top isometric view, and an exploded top isometric view of a fastener assembly 400 suitable for use as the fastener 210, according to at least some embodiments of the present disclosure. The fastener assembly 400 depicted in FIGS. 4A, 4B, and 4C is similar to the fastener assembly 300 discussed above except as explicitly noted below.

For example, FIG. 4A depicts the gas distribution plate 138 having a hole 402 formed therein for receiving the fastener assembly 400. The hole 402 includes a sidewall having a recess 404 disposed in a lower portion of the hole 402. The recess 404 can be formed in one or more regions of the hole 402, but is generally not formed completely around the hole, such that the fastener assembly 400 cannot rotate within the hole 402. For example, as depicted in FIG. 4, an end mill may be tilted at a first angle from normal to the gas distribution plate 138 to form a portion of the hole 402, and then tilted at a second angle from normal, such as opposite the first angle, to form the hole 402. The fastener assembly 400 can be inserted into the hole 402 and includes a threaded inner bore 306 to receive a bolt or screw when coupling the gas distribution plate 138 to the backing plate 139, such as a stainless steel bolt or screw (e.g., bolt or screw 212 depicted in FIG. 2).

The fastener assembly 400 includes the threaded insert 308 and a compliant jacket 410. The compliant jacket is similar to the compliant jacket 310 with the exception of geometry. For example, a protrusion 412, similar to protruding feature 312, is provided to match the recess 404 disposed the hole 402.

FIGS. 5A, 5B, and 5C respectively depict a top isometric view in cross-section, a top isometric view, and an exploded top isometric view of a fastener assembly 500 suitable for use as the fastener 210, according to at least some embodiments of the present disclosure. The fastener assembly 500 depicted in FIGS. 5A, 5B, and 5C is similar to the fastener assembly 300 discussed above except as explicitly noted below.

For example, the fastener assembly 500 depicted in FIG. 5A can be inserted in a hole in the gas distribution plate 138 similarly configured as the hole 302 discussed above. The hole 302 includes sidewall having recess 304 disposed in a lower portion of the hole 302. The fastener assembly 500 can be inserted into the hole 302 and includes a threaded inner bore 306 to receive a bolt or screw when coupling the gas distribution plate 138 to the backing plate 139, such as a stainless steel bolt or screw (e.g., bolt or screw 212 depicted in FIG. 2).

The fastener assembly 500 includes the threaded insert 308 and a compliant jacket 510. The compliant jacket 510 is similar to the compliant jacket 310 except that is it provided in multiple sections. For example, in some embodiments, the compliant jacket 510 includes a first half having a first protrusion 512 and a second half having a second protrusion 512. The first and second halves can be inserted into the hole 302 and fit into and/or conform to the recess 304. A spacer 520 is inserted between the portions of the compliant jacket 510 and holds the portions of the compliant jacket 510 in place. The spacer 520 generally includes an upper ring 522 having a central opening and a plurality of legs 524 extending downward from the upper ring. The plurality of legs 524 can be two legs on opposite sides of the upper ring 522 when the compliant jacket 510 includes two halves, such as shown in FIGS. 5A-5C. In some embodiments, the spacer 520 can be fabricated from a process-compatible metal, such as stainless steel.

The threaded insert 308 is disposed into the central opening of the spacer 520. The outer threads of the threaded insert 308 engage with both the spacer 520 (e.g., with inner diameter of the central opening of the upper ring 522 and with the inner surfaces of the plurality of legs 524) and the inner walls of the portions of the compliant jacket 510 to lock the fastener assembly 500 in the hole 302.

FIGS. 6A, 6B, and 6C respectively depict a top isometric view in cross-section, a top isometric view, and an exploded top isometric view of a fastener assembly 600 suitable for use as the fastener 210, according to at least some embodiments of the present disclosure. The fastener assembly 600 depicted in FIGS. 6A, 6B, and 5C is similar to the fastener assembly 500 discussed above except as explicitly noted below.

For example, the fastener assembly 600 can be inserted in a hole in the gas distribution plate 138 similarly configured as the hole 402 discussed above. The hole 402 includes sidewall having recess 404 disposed in a lower portion of the hole 402. The fastener assembly 600 can be inserted into the hole 402 and includes a threaded inner bore 306 to receive a bolt or screw when coupling the gas distribution plate 138 to the backing plate 139, such as a stainless steel bolt or screw (e.g., bolt or screw 212 depicted in FIG. 2).

The fastener assembly 600 includes the threaded insert 308 and a compliant jacket 610. The compliant jacket 610 is similar to the compliant jacket 310 except that is it provided in multiple sections, as discussed above with respect to the compliant jacket 510. For example, in some embodiments, the compliant jacket 610 includes a first half having a first protrusion 612 and a second half having a second protrusion 612. The first and second halves can be inserted into the hole 402 and fit into and/or conform to the recess 404. A spacer 620 is inserted between the portions of the compliant jacket 610 and holds the portions of the compliant jacket 610 in place. The spacer 620 generally includes an upper ring 622 having a central opening and a plurality of legs 624 extending downward from the upper ring. The upper ring 622 need not have a circular outer perimeter, and for example and as shown in FIGS. 6A-6C, the upper ring 622 can have a roughly square perimeter or other geometry. The non-circular geometry facilitates prevention of rotation of the fastener assembly 600 during installation or use. The plurality of legs 624 can be two legs on opposite sides of the upper ring 622 when the compliant jacket 610 includes two halves, such as shown in FIGS. 6A-6C. In some embodiments, the spacer 620 can be fabricated from a process-compatible metal, such as stainless steel.

The threaded insert 308 is disposed into the central opening of the spacer 620. The outer threads of the threaded insert 308 engage with both the spacer 620 (e.g., with inner diameter of the central opening of the upper ring 622 and with the inner surfaces of the plurality of legs 624) and the inner walls of the portions of the compliant jacket 610 to lock the fastener assembly 600 in the hole 402.

Figure 7A:
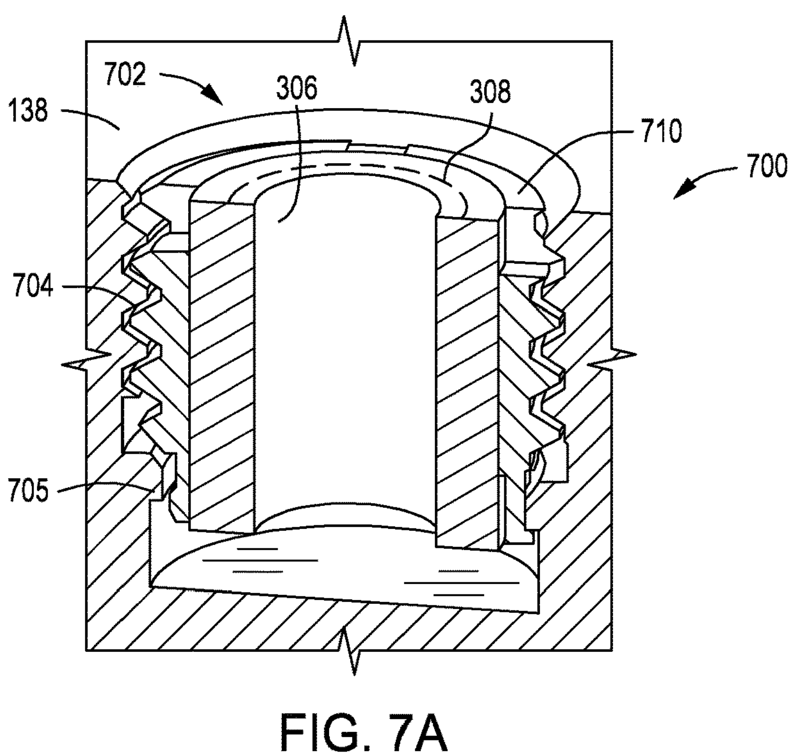
FIGS. 7A and 7B respectively schematically depict a top isometric view in cross-section and an exploded top isometric view of a fastener according to at least some embodiments of the present disclosure.
Figure 7B:
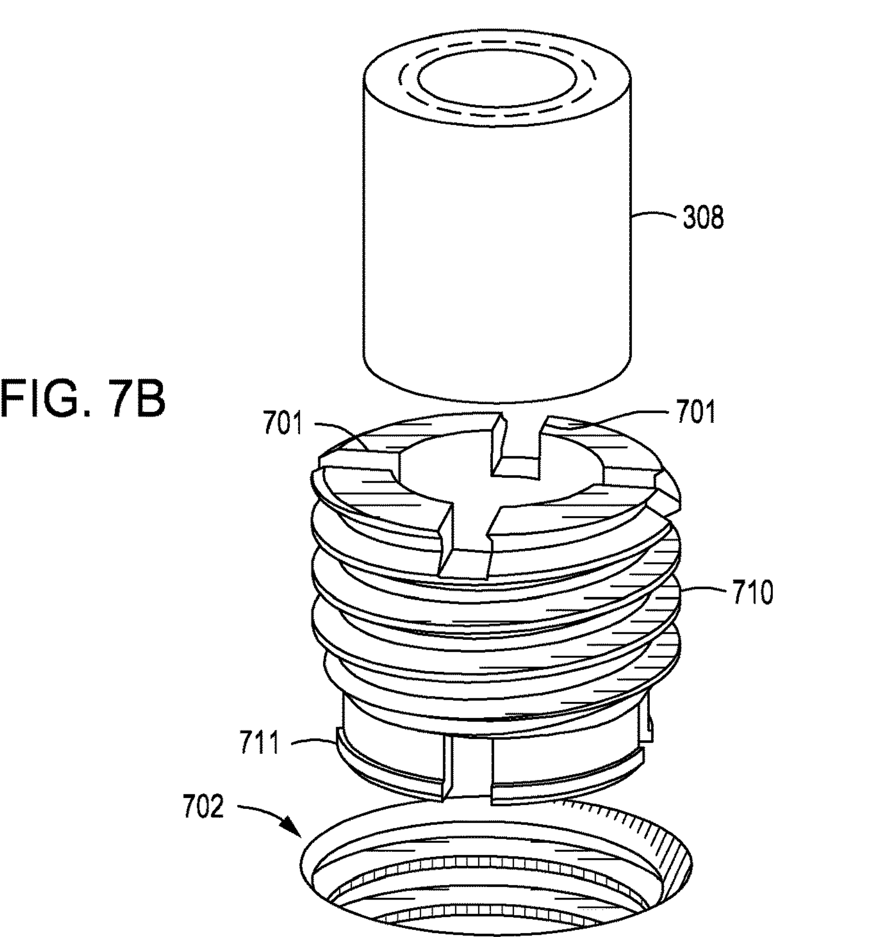

FIGS. 7A and 7B respectively depict a top isometric view in cross-section and an exploded top isometric view of a fastener assembly 700, suitable for use as the fastener 210, according to at least some embodiments of the present disclosure. The fastener assembly 700 is similar to the fastener assembly 300 discussed above except as explicitly noted below.

For example, FIG. 7A depicts the gas distribution plate 138 having a hole 702 formed therein for receiving the fastener assembly 700. The hole 702 includes a sidewall having a threaded portion 704 and a protrusion 705 disposed below the threaded portion 704 of the hole 702. For example, the threaded portion can end at a radially inwardly extending ledge with a recess disposed beneath the ledge to form the protrusion 705. The fastener assembly 700 can be inserted into the hole 702 and includes a threaded inner bore 306 to receive a bolt or screw when coupling the gas distribution plate 138 to the backing plate 139, such as a stainless steel bolt or screw (e.g., bolt or screw 212 depicted in FIG. 2).

A compliant jacket 710, which can be fabricated of materials similar to those discussed above with respect to the compliant jacket 310, is disposed in the hole 702 and includes a threaded outer wall that mates with threaded portion 704 and facilitates insertion and retention of the compliant jacket 710 within the hole 702. The compliant jacket 710 further includes a lower protrusion 711 which can interface with the protrusion 705 to lock the compliant jacket 710 in place once installed. For example, the lower protrusion 711 can extend radially outward from a lower portion of the compliant jacket 710. One or more cuts can be made through the sidewalls of the lower portion of the compliant jacket 710 to form springs or flexures that facilitate deflection of the lower protrusion around the protrusion 705 during installation. The combination of the threads bottoming out on the ledge of the hole 702 and the interlocking of the lower protrusion 711 and the protrusion 705 effectively secure the compliant jacket in place once installed in the hole 702. In some embodiments, on or more features 701 may be provided in an upper surface of the compliant jacket 710 to facilitate rotation of the compliant jacket 710 during installation, e.g., to facilitate use of a tool to drive the rotation of the compliant jacket 710.

The compliant jacket 710 surrounds the threaded insert 308 and is coupled thereto. For example, the threaded insert 308 may have a threaded outer wall that mates with an inner wall of the compliant jacket 710. For example, where the threaded insert 308 is a helical coiled wire, the threaded insert 308 may be twisted into a central opening of the compliant jacket 710 during installation.

Figure 8A:
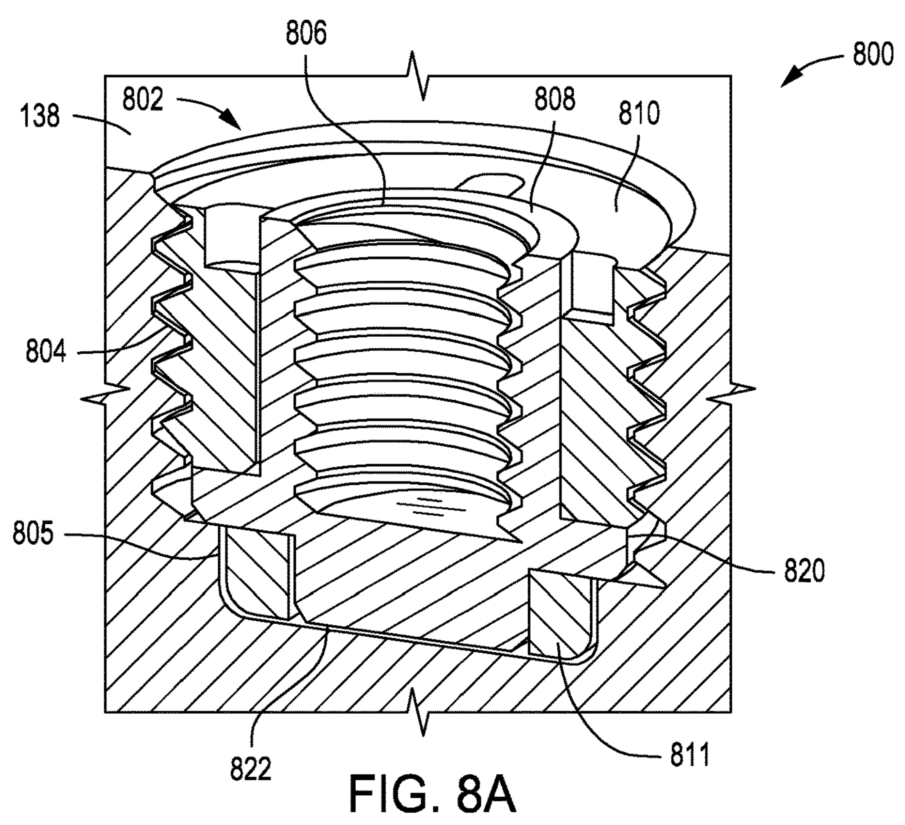
FIGS. 8A and 8B respectively schematically depict a top isometric view in cross-section and an exploded top isometric view of a fastener according to at least some embodiments of the present disclosure.
Figure 8B:
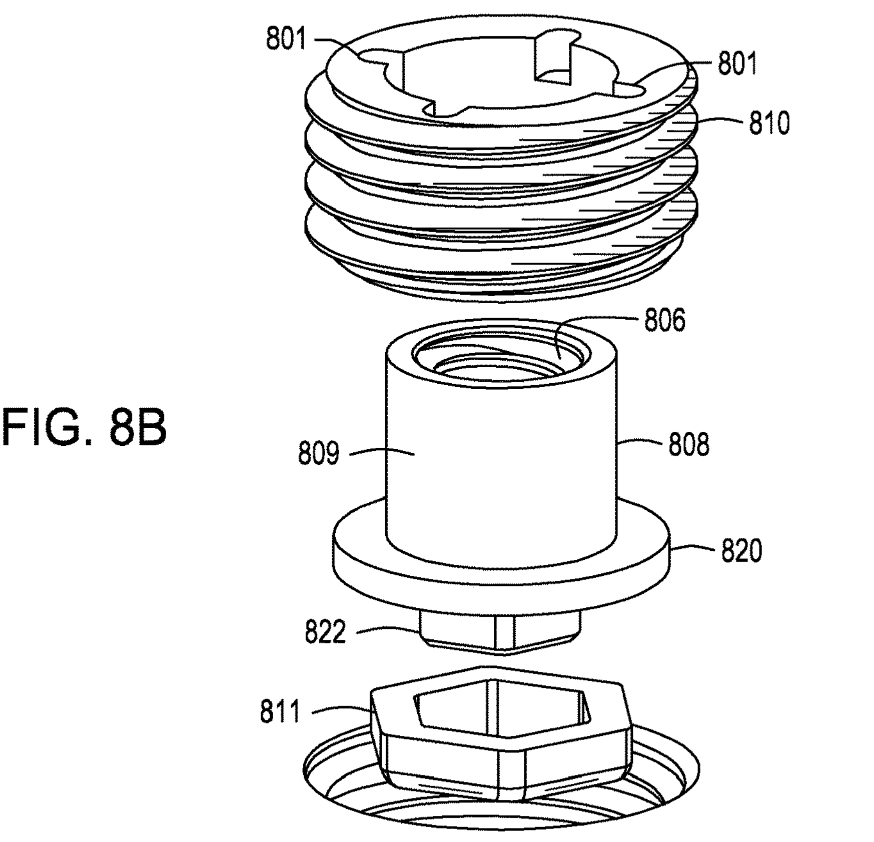

FIGS. 8A and 8B respectively depict a top isometric view in cross-section and an exploded top isometric view of a fastener assembly 800, suitable for use as the fastener 210, according to at least some embodiments of the present disclosure.

For example, FIG. 8A depicts the gas distribution plate 138 having a hole 802 formed therein for receiving the fastener assembly 800. The hole 802 includes a sidewall having a threaded portion 804 and a non-circular bottom portion 805 disposed below the threaded portion 804 of the hole 802. For example, the threaded portion 804 can end with the hole 802 continuing into the gas distribution plate 138 with a non-circular perimeter to form the non-circular bottom portion 805. For example, in some embodiments, the non-circular bottom portion 805 is hexagonal, although other non-circular geometries can be used. The fastener assembly 800 can be inserted into the hole 802 and includes a threaded inner bore 806 to receive a bolt or screw when coupling the gas distribution plate 138 to the backing plate 139, such as a stainless steel bolt or screw (e.g., bolt or screw 212 depicted in FIG. 2).

A locking spacer 811 can be disposed in the bottom of the hole 802. The locking spacer includes a peripheral geometry that correspond to the shape of the non-circular bottom portion 805, such that the locking spacer 811 can be non-rotationally disposed within the non-circular bottom portion 805 of the hole 802. The locking spacer 811 further includes a non-circular inner opening. The locking spacer 811 can be fabricated of materials similar to those discussed above with respect to the compliant jacket 310.

An insert 808 is provided that includes an upper cylindrical portion 809, a radially extending flange 820, and a non-circular lower portion 822. The upper cylindrical portion 809 includes a threaded central opening that forms the threaded inner bore 806 of the fastener assembly 800. The non-circular lower portion 822 has a peripheral geometry that correspond to the shape of the non-circular inner opening of the locking spacer 811, such that the non-circular lower portion 822 of the insert 808 can be non-rotationally disposed within the non-circular opening of the locking spacer 811.

A compliant jacket 810, which can be fabricated of materials similar to those discussed above with respect to the compliant jacket 310, is disposed in the hole 802 and includes a threaded outer wall that mates with threaded portion 804 and facilitates insertion and retention of the compliant jacket 810 within the hole 802. In some embodiments, on or more features 801 may be provided in an upper surface of the compliant jacket 810 to facilitate rotation of the compliant jacket 810 during installation, e.g., to facilitate use of a tool to drive the rotation of the compliant jacket 810.

Returning to FIG. 2, in some embodiments, a second plurality of connectors 248 may also optionally be used to couple the gas distribution plate 138 to the backing plate 139. In some embodiments, the connectors 248 are configured to be bonded to the inner portion 202 and/or the outer portion 204 of the gas distribution plate 138 and are configured to connect the gas distribution plate 138 to the backing plate 139. A bonding layer disposed between the connectors 248 and the gas distribution plate 138 (not explicitly shown) can be organic bonding material or diffusion bonding material. For example, in at least some embodiments, the bonding layer can be Al or an aluminum silicon alloy (AlSi) material. One or more thermal gaskets can be used in conjunction with bonding layer. The bonding layer may be provided at about 550 degrees Celsius to about 600 degrees Celsius and may have a thickness of about 2 microns to 40,000 microns. Additionally, the bonding process may have a dwell time of about 2 hours to about 4 hours and a cooling rate of about 3 K/min to about 7 K/min. Embodiments of the connectors 248 are described in greater detail in U.S. patent application Ser. No. 16/780,855, filed Feb. 3, 2020, and entitled "Showerhead Assembly", assigned to Applied Materials, Inc., which is hereby incorporated by reference in its entirety.

In some embodiments, a plurality of apertures 206 are disposed along a top surface 208 of the backing plate 139. The apertures 206 are configured to receive a corresponding plurality of threaded bolts or screws 212. The plurality of bolts or screws are driven through a corresponding plurality of apertures that extend through a top surface of the backing plate 139 for connecting the backing plate 139 to the gas distribution plate 138 (e.g., into holes 302, 402, 702, 802 shown in FIGS. 3A-8B). More particularly, the apertures 206 are vertically aligned with the second plurality of connectors 248 defined in a bottom surface 249 of the backing plate 139.

One or more temperature detection assemblies can be coupled to the gas distribution plate 138, e.g., on a top surface of the inner portion 202 and outer portion 204, for example, using one of the above-described bonding processes. For illustrative purposes, a temperature detection assembly 250 is shown coupled to the top surface of the inner portion 202. The temperature detection assembly 250 is configured to monitor a temperature of the gas distribution plate 138 during processing. For a more detailed description of the temperature detection assembly 250 and monitoring processes used therewith, reference is made to U.S. Patent Publication 2018/0144907, entitled "THERMAL REPEATABILITY AND IN-SITU SHOWERHEAD TEMPERATURE MONITORING," assigned to Applied Materials, Inc., which is incorporated herein by reference in its entirety. The temperature detection assembly 250 is configured to be received within a corresponding aperture defined within the bottom surface 249 of the backing plate 139.

While the foregoing is directed to embodiments of the present disclosure, other and further embodiments of the disclosure may be devised without departing from the basic scope thereof.

We claim:

1. A fastener assembly for coupling components in a substrate processing chamber, comprising:

a threaded insert having a threaded inner bore, wherein the threaded insert includes an upper cylindrical portion, a radially extending flange, and a non-circular lower portion, wherein the threaded inner bore is disposed in a central opening of the upper cylindrical portion; and a compliant jacket surrounding the threaded insert and having one or more protruding features extending radially outward from the compliant jacket, wherein an upper end of the threaded insert does not extend beyond an upper end of the compliant jacket, and wherein the compliant jacket includes a threaded outer wall.

2. The fastener assembly of claim 1, wherein the compliant jacket is fabricated from materials that have a coefficient of thermal expansion (CTE) of about 2 to about 11.

3. The fastener assembly of claim 1, further comprising a locking spacer configured to fit over the non-circular lower portion such that the non-circular lower portion of the threaded insert can be non-rotationally disposed within a non-circular opening of the locking spacer.

4. The fastener assembly of claim 1, wherein the threaded insert is a helical coil wire.

5. A showerhead for use in a substrate processing chamber, comprising:

a backing plate;

a gas distribution plate; and a plurality of fasteners coupling the backing plate to the gas distribution plate, wherein at least one fastener of the plurality of fasteners is a fastener assembly comprising:

a threaded insert having a threaded inner bore; and a compliant jacket surrounding the threaded insert and having one or more protruding features extending radially outward from the compliant jacket;

wherein the threaded insert and the compliant jacket are disposed in a hole disposed in the gas distribution plate, wherein the hole includes at least one recess configured to receive and mate with the one or more protruding features of the compliant jacket such that the fastener assembly cannot rotate within the hole, wherein the hole includes a sidewall having a threaded portion and either:

a recess disposed below the threaded portion of the hole; or a non-circular bottom portion disposed below the threaded portion of the hole.

6. The showerhead of claim 5, wherein the hole includes the recess, and wherein the threaded portion ends at a radially inwardly extending ledge, and wherein the recess is disposed beneath the ledge.

7. The showerhead of claim 5, wherein the hole includes the non-circular bottom portion, and wherein the non-circular bottom portion is hexagonal.

8. A showerhead for use in a substrate processing chamber, comprising:

a backing plate;

a gas distribution plate;

a plurality of fasteners coupling the backing plate to the gas distribution plate, wherein at least one fastener of the plurality of fasteners is a fastener assembly comprising:

a threaded insert having a threaded inner bore; and a compliant jacket surrounding the threaded insert and having one or more protruding features extending radially outward from the compliant jacket;

wherein the threaded insert and the compliant jacket are disposed in a hole disposed in the gas distribution plate, wherein the hole is a blind hole only partially disposed in the gas distribution plate, and wherein the hole includes at least one recess configured to receive and mate with the one or more protruding features of the compliant jacket such that the fastener assembly cannot rotate within the hole; and a bolt disposed through an opening in the backing plate and engaging with the threaded inner bore of the threaded insert to fasten the backing plate to the gas distribution plate.

* * * * *